(12) United States Patent
Dietsch et al.

(10) Patent No.: US 7,912,633 B1
(45) Date of Patent: Mar. 22, 2011

(54) MOBILE AUTONOMOUS UPDATING OF GIS MAPS

(75) Inventors: Jeanne Dietsch, Peterborough, NH (US); William Kennedy, Peterborough, NH (US); Matthew LaFary, Peterborough, NH (US)

(73) Assignee: Adept MobileRobots LLC, Pleasanton, CA (US)

( * ) Notice: Subject to any disclaimer, the term of this patent is extended or adjusted under 35 U.S.C. 154(b) by 1053 days.

(21) Appl. No.: 11/606,775

(22) Filed: Nov. 30, 2006

Related U.S. Application Data

(60) Provisional application No. 60/742,160, filed on Dec. 1, 2005.

(51) Int. Cl.
*G06G 7/78* (2006.01)

(52) U.S. Cl. .......................................... 701/208; 702/5

(58) Field of Classification Search .................. 701/23, 701/25, 28, 208, 223; 702/5; 348/118, 119; 318/587; 180/167–169
See application file for complete search history.

(56) References Cited

U.S. PATENT DOCUMENTS

| | | | |
|---|---|---|---|
| 6,009,359 A | 12/1999 | El-Hakim et al. | |
| 6,363,161 B2 | 3/2002 | Laumeyer et al. | |
| 6,453,056 B2 | 9/2002 | Laumeyer et al. | |
| 6,917,893 B2 | 7/2005 | Dietsch et al. | |
| 7,069,124 B1 * | 6/2006 | Whittaker et al. | ............. 701/28 |
| 7,602,404 B1 * | 10/2009 | Reinhardt et al. | ............ 345/629 |
| 2004/0139049 A1 | 7/2004 | Hancock et al. | |

OTHER PUBLICATIONS

Ex Parte Quayle action, from U.S. Appl. No. 11/603,242, dated Aug. 12, 2009.
Gutmann, S. et al., "Incremental Mapping of Large Cyclic Environments," Proceedings of the IEEE International Symposium on Computational Intelligence in Robotics and Automation (CIRA) (2000).
Thrun, S., "A Probabilistic Online Mapping Algorithm for Teams of Mobile Robots," Int' J. Robotics Res. 20(5):335-363 (2001).
Thrun, S. et al., "Using EM to Learn 3D Models with Mobile Robots," http://www-2.cmu.edu/.about.thrun/papers/thrun.3D-EM.html, Jun. 28-Jul. 1, 2001.

* cited by examiner

*Primary Examiner* — Dalena Tran
(74) *Attorney, Agent, or Firm* — Nutter McClennen & Fish LLP

(57) ABSTRACT

A method for mobile autonomous updating of GIS maps is provided. In the method, an autonomous mobile data collecting platform is provided with a map identifying one or more GIS features. The platform has at least one data collecting sensor for collecting data for at least one of the GIS features and patrols at least a portion of a region included in the map while updating its GIS position as it patrols. The autonomous mobile data collecting platform applies the at least one data collecting sensor during patrolling to collect data for at least one of the GIS features and updates the GIS map to reflect differential data collected for at least one GIS feature.

30 Claims, 6 Drawing Sheets

MOBILE AUTONOMOUS UPDATING OF GIS MAPS

RELATED APPLICATIONS

This application claims priority to U.S. Provisional Patent Application Ser. No. 60/742,160, filed on Dec. 1, 2005 and entitled "Mobile Autonomous GIS Updating Method," which application is incorporated herein by reference in its entirety.

BACKGROUND OF THE INVENTION

Creating spatial representations of the world for use in decision-making, navigation and many other applications, has grown into an enormous GIS (Geographical Information System, or sometimes, Global Information System) that links natural and man-made features with their relative and unique 3-D positions on or near Earth. Data include Earth topography and vegetation, as mostly gathered by satellite imagery. Other Features, such as the centerline of a road, are gathered by driving a vehicle with a GPS (Global Positioning System) system and noting the location of intersections and waypoints. Utility locations are input by surveying with GPS. Collected into GIS databases, the data subsequently are used for vehicle navigation, building operations, emergency response, environmental health, and a wide variety of other applications.

GIS data are often physical phenomena. Originally, GIS consisted of databases of satellite images of Earth, typically taken in multiple spectra. By comparing the various images over time, objects, changes, and patterns could be identified. While some features and their attributes can be imaged from satellites very efficiently, many physical objects are out of satellite view. Even where features are in view, it can be difficult to distinguish those features in a satellite view, and it is especially difficult to distinguish them automatically using software image analysis, for example. As a result, many features must be located manually, or local sensors must be placed at known locations to locate and/or track specific features. These methods can be expensive and time consuming, so most GIS data tends to be acquired once, and is updated rarely, if ever.

GIS data updates, however, are need for differential analyses in a number of different areas. In a security application, for example, change analysis may detect and locate intruders or re-locate moveable assets. For hazard detection, changing levels of water, heat, smoke, radiation, or gases may initiate investigations. For foresters, tree trunk sizes may indicate time to harvest.

SUMMARY OF THE INVENTION

The present invention involves the updating of maps in a universal uniform spatial reference frame. In preferred embodiments, the invention the maps are in GIS space (i.e., using GPS coordinates) and include a number of features that have attributes and/or locations that can change over time. An autonomous mobile data collecting platform patrols routes on the map and updates data with respect to those features.

In a first aspect of the invention, a method for mobile autonomous updating of GIS maps is provided. In the method, an autonomous mobile data collecting platform is provided with a map identifying one or more GIS features. The platform has at least one data collecting sensor for collecting data for at least one of the GIS features and patrols at least a portion of a region included in the map while updating its GIS position as it patrols. The autonomous mobile data collecting platform applies the at least one data collecting sensor during patrolling to collect data for at least one of the GIS features and updates the GIS map to reflect differential data collected for at least one GIS feature.

In a further aspect of the invention, a method for recording differential data on a map indexed in a uniform universal reference frame is provided. In the method, an autonomous mobile data collecting platform is provided with a map identifying plurality of features in the reference frame. The platform has at least one data collecting sensor for collecting data for at least one of the features and at least one positioning sensor for determining the autonomous mobile platform's location on the map. The autonomous mobile data collecting platform patrols at least a portion of a region included in the map and applies the at least one positioning sensor to update its position on the map as it patrols. The autonomous mobile data collecting platform further applies the at least one data collecting sensor as it patrols to collect data for at least one feature. The map is then updated to reflect differential data collected for the feature.

BRIEF DESCRIPTION OF THE DRAWINGS

The invention will be more fully understood from the following detailed description taken in conjunction with the accompanying drawings.

DETAILED DESCRIPTION OF THE ILLUSTRATED EMBODIMENTS

Figure 1:
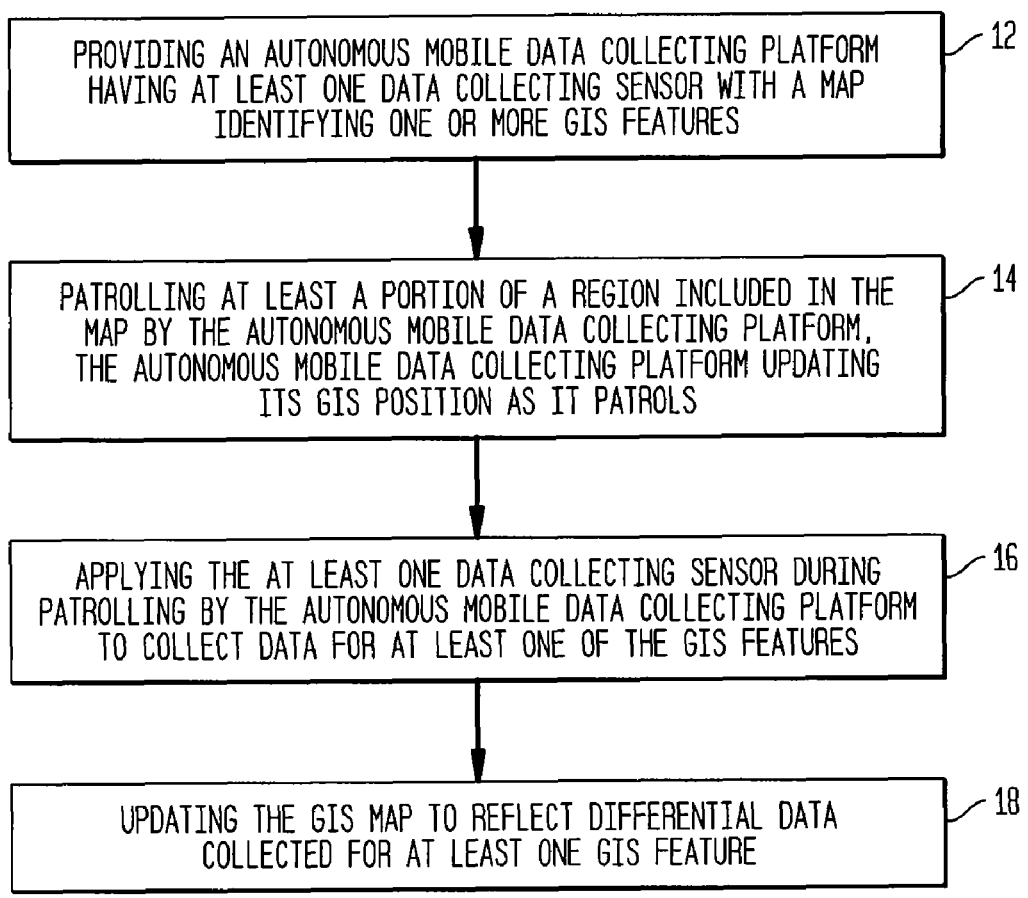
FIG. 1 provides a diagram illustrating a flow of steps in a method according to one embodiment of the invention.

An exemplary method 10 for mobile autonomous updating of a map in a universal uniform spatial reference frame, such as the GIS reference frame, is illustrated in FIG. 1. As used herein, GIS refers to Global Information System, a generic term for a spatial database in which the spatial information is linked to GPS coordinates. Similarly, GPS refers to the Global Positioning System in which satellite-based radio systems, typically satellite-based, provide three-dimensional position and time information to which suitably equipped receivers anywhere on or near the surface of the Earth compute their global position, velocity and orientation (heading). While GIS is used as the preferred universal uniform spatial reference frame, it should be understood from the description that other spatial reference frames are possible.

In step 12 in the illustrated method 10, an autonomous mobile data collecting platform is provided with a map having one or more GIS features with the autonomous mobile data collecting platform having at least one data collecting sensor. The map allows the autonomous mobile data collecting platform to navigate in the desired spatial environment. For outdoor navigation, path planning can be performed using any of the widely available GPS path-planning software packages. Alternatively, navigation can be performed by the autonomous mobile data collecting platform itself using GPS-based navigation, VSLAM, or one from among the many available path-planning techniques. In areas with poor or non-existent GPS reception, such as indoors, the autonomous mobile data collecting platform can navigate using "value-iterated search," gradient navigator, or other techniques for navigation of indoor mapped spaces. In one embodiment, a GIS map of a region including a poor GPS reception area can be generated using the techniques disclosed in co-pending U.S. patent application Ser. No. 11/603,242 to Dietsch et al., entitled "Method for Mapping Spaces with Respect to a Universal Uniform Spatial Reference," and filed on Nov. 21, 2006, which application is incorporated herein by reference in its entirety.

A feature, as used herein (for example, the GIS feature in step 12), refers to an object within the universal uniform spatial reference frame that may have associated attributes. An example of a feature might be a door. Attributes refer to characteristics of a feature. By way of further example where the feature is a door, its attributes might include the manufacturer of the door, the model name or number, the height and width of the door, and whether the door is open or closed.

The autonomous mobile data collecting platform 14 patrols at least a portion of a region included in the map and updates its GIS position as it patrols. At least one data collecting sensor is applied 16 during the patrolling to collect data for at least one GIS feature, and the GIS map is updated 18 to reflect differential data collected for that feature.

Various routes can be created for the autonomous mobile data collecting platform to patrol. Routes may contain locations where sensor readings are to be taken. Data collecting sensor readings also may be taken continuously along the route and/or taken when the autonomous mobile data collecting platform encounters a natural or artificial marker. A marker, as used herein, can be a distinctive emitter or reflector that fixes an identifiable point of recognition within a mapped space. Markers may be natural or artificially applied. Examples include, but are not limited to, lights, highly polished reflectors, infrared emitters, RFID tags and visual symbols.

The autonomous mobile data collecting platform may be sent on one or more sensing routes on demand by an operator or by an external automated control system. As used herein, a route is a series of destinations and/or waypoints that at least partially define a path to be followed by the platform. The autonomous mobile data collecting platform also may be sent on demand by an operator or by an external automated control system to one or more locations other than those specified in a route and perform data collection along the path and/or when it arrives at the location(s). Schedules or other time-task databases may be created to send the autonomous mobile data collecting platform on sensing routes.

As the autonomous mobile data collecting platform patrols, it can link time and position coordinates with data from at least one sensor (see U.S. Pat. No. 6,917,893 to Dietsch et al., issued on Jul. 12, 2005 and entitled "Spatial Data Collection Apparatus and Method," which patent is hereby incorporated by reference herein). Wherever possible, the time and position coordinates can be generated by GPS. If GPS is not available, the platform will determine the time from its onboard clock and its position via Monte-Carlo/Markov localization (further described in U.S. Pat. No. 6,917,893 and below), VSLAM (Visual Simultaneous Localization And Mapping; a technique relying on at least one video camera and used by an autonomous vehicle to build a map within an unknown environment while at the same time keeping track of its current position) with stereo-camera range information or a similar technique that compares the autonomous mobile data collecting platform position relative to walls and other stationary objects in a previously mapped space. The position information, so derived, can then translated into GIS coordinates. The time, as measured by the onboard clock or otherwise, can be calibrated to a global time reference, such as Greenwich Mean Time.

The autonomous mobile data collecting platform may immediately transmit the GIS sensor data via its communications device to an off-board GIS for storage and/or analysis, and/or it may store the data onboard for later communication with the GIS.

Figure 2:
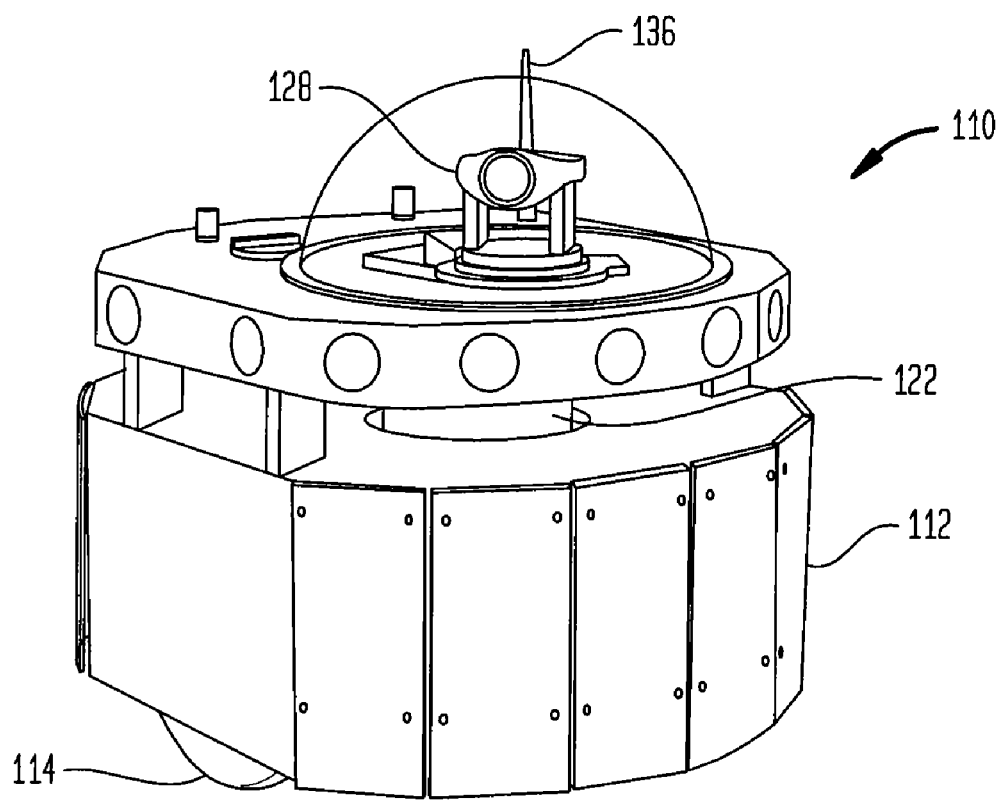
FIG. 2 illustrates an autonomous mobile data collecting platform useful with the invention.
Figure 3:
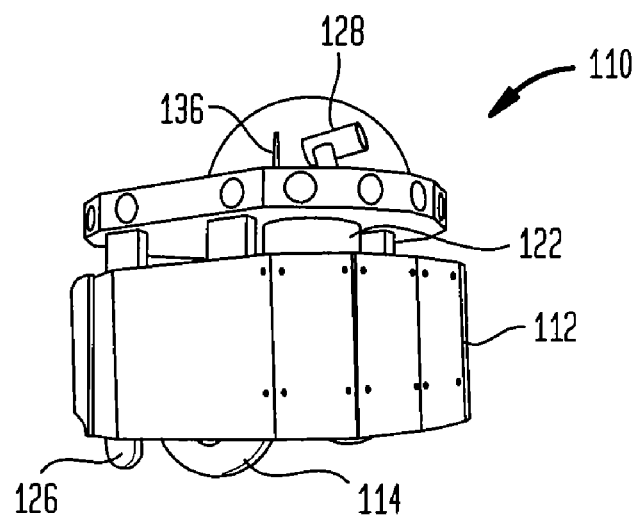
FIG. 3 provides an additional view of the autonomous mobile data collecting platform of FIG. 2.

The mobile platform apparatus used in the method can take a variety of physical forms. The mobile platform can be autonomous using, for example, SLAM techniques (Simultaneous Localization And Mapping, a technique used by an autonomous vehicle to build a map within an unknown environment while at the same time keeping track of its current position). In the further embodiments illustrated below with respect to FIGS. 2, 3 and 4, a particular autonomous mobile data collecting platform is described.

An exemplary autonomous mobile data collecting platform 110 useful with the invention includes a mobile platform 112 and at least one wheel 114 attached to the platform 112, for example, using hubs. The autonomous mobile data collecting platform 110 can also include one or more positional sensors 120 (shown schematically), such as shaft encoders and/or an inertial measurement unit (IMU), for generating the positional data. In addition, the positional sensors 120 could include a GPS receiver for determining the position of the autonomous mobile data collecting platform in GPS coordinates. The autonomous mobile data collecting platform 110 can further include one or more range-finding devices 122 located on the platform 112 for measuring and calculating the range data. The collection and correlation of the positional data and range data can be used to help the autonomous mobile data collecting platform to localize its position and navigate on the map.

The preferred embodiment of the autonomous mobile data collecting platform 110 is designed to permit movement in a way that will minimize errors in the positional data and the range data. The preferred embodiment includes wheels 114 that are preferably sized and located to allow the platform 112 to rotate in place. The wheels 114 are also large enough to allow the platform 112 to traverse or surmount common obstacles, such as sills, low steps, carpet edges and cords, without having to lift the apparatus 110 and while maintaining the platform 112 substantially level. The preferred embodiment of the apparatus 110 also includes casters 126 or another type of wheel or structure to keep the mobile platform 112 and the range-finding device(s) 122 level as the platform 112 moves.

The autonomous mobile data collecting platform 110 can further include one or more other sensors 128 such as the illustrated recording devices (camera and microphone), for example. The autonomous mobile data collecting platform 110 can also include additional sensors for recording other types of data (e.g., thermal, gas, radiation, biohazard, moisture, or motion) or other types of input devices for recording information such as text. Sensors 128 can also include sensors that are specific to collecting data regarding attributes of features on the map. For example, sensors 128 could include an RFID sensor, or, more precisely, an RFID tag interrogator. In a typical RFID system, individual objects are equipped with a small tag. The tag contains a transponder with a digital memory chip that is given a unique electronic product code or other attributes for the feature to which the tag is attached. The interrogator, an antenna packaged with a transceiver and decoder, emits a signal activating the RFID tag so it can read and/or write data to it. When an RFID tag is proximate to the interrogator, it detects the reader's activation signal. The reader decodes the data encoded in the tag's integrated circuit (silicon chip) and the data is passed to the on-board computational device 130.

Figure 4:
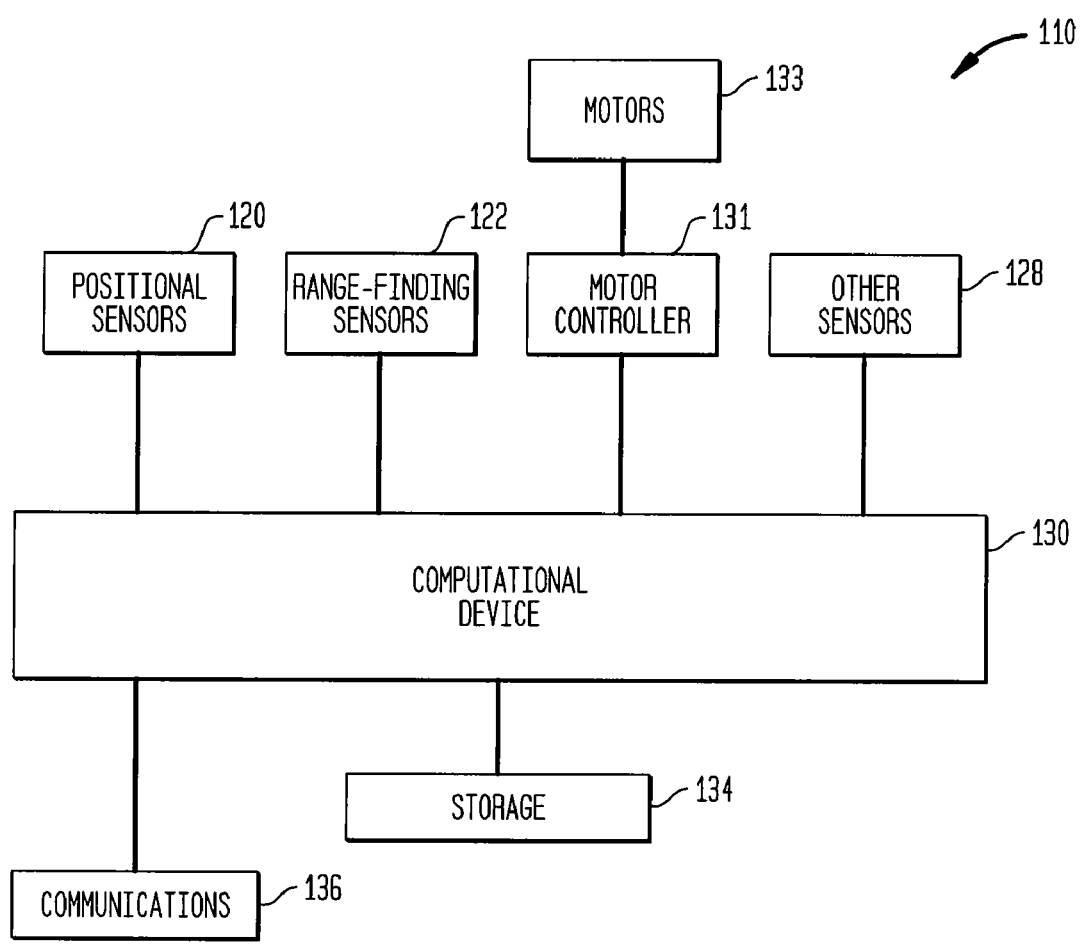
FIG. 4 provides a schematic illustration of elements of the autonomous mobile data collecting platform of FIG. 2.

The autonomous mobile data collecting platform 110 includes a computational device 130, such as an onboard computer having a processor, connected to the positional sensor(s) 120, the range-finding device(s) 122, and the other sensor(s) 128, as shown schematically in FIG. 4. The computational device 130 collects the positional data and the range data and correlates the range data to the positional data representing the locations of the apparatus 110 when the range-data was obtained. The correlated range data and positional data is referred to collectively as spatial data. Any information recorded by the sensor(s) 128 is positionally embedded with the spatial data according to the locations of the apparatus 110 at the time the information was recorded. A storage device or system 134 stores the range-data along with the positional data representing the locations of the apparatus 110 when the range-data was obtained (i.e., the spatial data). The storage system 134 also stores any positionally embedded recorded information. The data can also be transferred to an external computer network using communication element 136, which can be a wireless networking transceiver (using the Blue Tooth or other IEEE 802.11 protocols for example), for use in creating 2-D or 3-D graphical representations of the space, i.e., maps. The computational device 130 and/or computer network (not shown, communicated with through communications element 136) generally includes software for collecting the data for fusing and correlating the data to create or add to a map, to navigate routes on a map, or to locate and update information or attributes of features on the map.

In an exemplary embodiment, the positional sensors 120 include both shaft encoders for generating odometry data and an inertial measurement unit (IMU) for generating IMU data used to correct the odometry data. Alternatively, the shaft encoders can be used without the IMU, or vice versa, to generate the positional data. The shaft encoders can be attached to each wheel 114 to record the odometry data, i.e., changes in the position of each wheel 114 relative to the hub or other attachment to the apparatus 110. One example of a shaft encoder is a 2048-tick encoder such as the type that is known to those of ordinary skill in the art. Encoder driver software on the computational device 130 can collect and convert raw odometry data into (x, y, theta.) coordinate systems. One example of the encoder driver software can be incorporated in the controller software, such as in the Advanced Robotics Control and Operations Software (AR-COS) from MobileRobots Inc.

An IMU can be located on the apparatus 110 to measure radial and/or translational motion of the apparatus. The IMU can be a rate gyroscope, a magnetometer and/or an accelerometer. The IMU can be used to correct for errors in the odometry data (e.g., caused by slippage or other errors in encoder information), especially for determining the positional orientation of the apparatus. One example of an IMU is the inertial sensor available from Systron Donner Inertial under the name MMQ-50.

As the apparatus 110 is autonomous, it will require a motor controller 131 and motors 133 to drive wheels 114. Motors and their controllers useful with the invention will be known to persons skilled in the art, and digital stepper motors may beneficially be used. Data collected from motor operation and control may also be used as a measure of odometry, in addition to or in place of shaft encoders.

The range-finding device 122 preferably includes a laser rangefinder capable of measuring range data (i.e., distances and angles with respect to the apparatus 110) from many points in the space nearly simultaneously (e.g., 180 or more range data points in a single scan). One example of the laser rangefinder is the type available from SICK AG under the name SICK LMS200. Rangefinder driver software can collect and/or process the raw range data on computational device 130 and/or any computer network communicated with using communications element 136. The autonomous mobile data collecting platform 110 can also include another range-finding device for collecting 3-D range data.

In a further embodiment, the autonomous mobile data collecting platform 110 the positional sensor(s) 120 together with a distance-measuring device, such as a Leica Disto meter available from Leica Geosystems, held in place by a pan-tilt mount with angular position sensing. The distance measuring device is aimed at each corner of the room, doorway, window, and vertices of other objects and the range data is measured with respect to the vertices. The form of the room and position, size and shape of each doorway, window, and other object is calculated based on the vertices rather than the edges and/or surfaces of the shape.

The computational device can include application program interface (API) software for collecting and correlating the positional data and the range data. One example of API software is the Advanced Robotics Interface for Applications (ARIA) software available from MobileRobots Inc. The API software can collect and time-stamp the odometry data received from the positional sensors 120. The API software can use, for example, a Kalman filter to fuse any odometry data with any IMU data and to correct for any discrepancies in the odometry data based on the IMU data. The API software can then interpolate from the fused positional data where the apparatus was when the range data was measured. The API software can record the spatial data, i.e., the range data along with the positional data representing the locations of the apparatus when the range data was measured. Data collected by other sensor(s) 128 can be similarly linked to the time and location of the apparatus 110 when and where the data was collected.

The onboard computational device 130 can also include additional ports for connecting additional sensors, such as thermal, gas, moisture, motion or other sensing devices, to the autonomous mobile data collecting platform 110.

In one embodiment, the computational device 130 and/or a computer network linked to the computational device 130 using communications element 136 includes mapper software for creating 2-D or 3-D graphical representations of the spatial data collected and viewing and/or editing the graphical representation and providing that map to the autonomous mobile platform. The autonomous mobile data collecting platform 110 itself may do the mapping, or the map can be generated by the device disclosed in U.S. Pat. No. 6,917,893 (incorporated by reference above), or the map can be a GIS map that is provided from another source.

Figure 5:
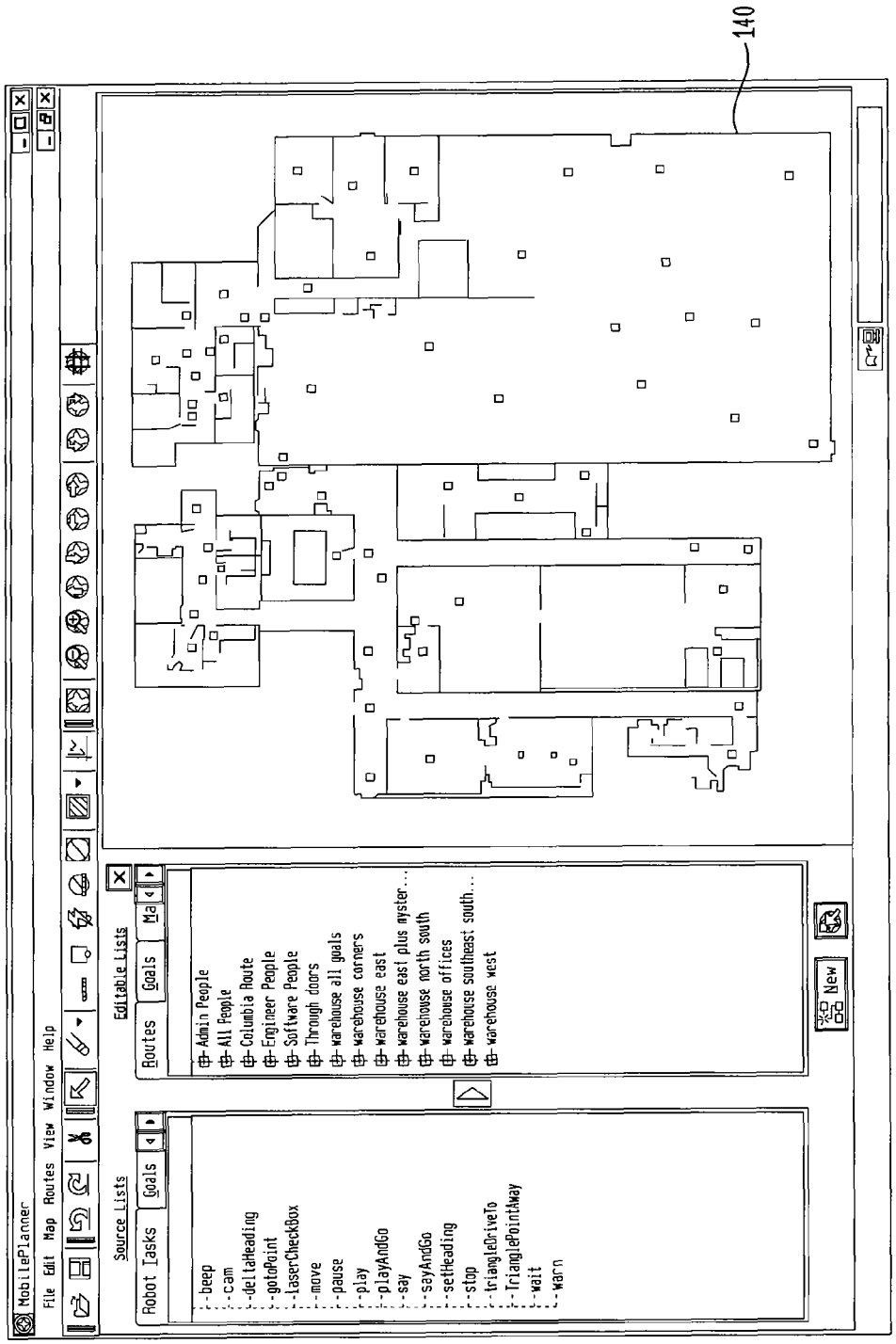
FIG. 5 illustrates a map generated by the autonomous mobile data collecting platform of FIG. 2.

The terms "map, mapper and mapping" are used herein to refer to any type of 2-D or 3-D graphical representation of an existing space. An exemplary map 140 of an indoor space is illustrated in FIG. 5. The mapper software can include a map builder that converts spatial data log files into the 2-D or 3-D graphical representation and creates the representation of the spatial data with positionally embedded sensor data files. Thus, features and attributes, including permanent and temporarily placed audio, video, sensor or other data files that are related by means of naming convention, reference table or other means to a specific position in the map can be displayed and retrieved from that position in the map. The preferred embodiment of the map builder is capable of creating different types of map outputs in different formats such as vector formats (e.g., .dwg, .dlg, etc.) and grid formats (e.g., .bmp, etc.).

One example of a map builder includes software such as the type available under the name Scan Studio for performing the conversion of the log files and creating the 2-D or 3-D representations. Examples of these mapping algorithms, which are known to those of ordinary skill in the art, are described in greater detail by S. Gutmann and K. Konolige in the paper Incremental Mapping of Large Cyclic Environments, In Proceedings of the IEEE International Symposium on Computational Intelligence in Robotics and Automation (CIRA), 2000, and by Sebastian Thrun in the paper A Probabilistic Online Mapping Algorithm for Teams of Mobile Robots, International Journal of Robotics Research, 20(5):335-363, 2001, both of which are incorporated herein by reference. One example of three-dimensional map building algorithms, which are known to those of ordinary skill in the art, are described by Yufeng Liu, Rosemary Emery, Deepayan Chakrabarti, Wolfram Burgard and Sebastian Thrun in Using EM to Learn 3D Models with Mobile Robots (published online at http://www-2.cs.cmu.eduLabout.thrun/papers/thrun.3D-EM.html), which is fully incorporated herein by reference.

Figure 6:
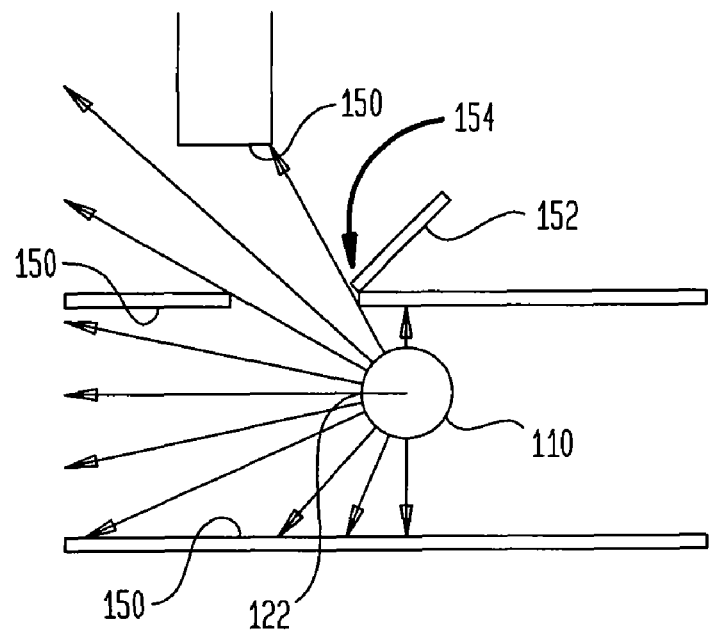
FIG. 6 illustrates the patrolling of an autonomous mobile data collecting platform while determining a feature of an attribute.

Autonomous mobile data collecting platform 110 is shown in FIG. 6 patrolling 14. As autonomous mobile data collecting platform 110 patrols down the illustrated hallway using a map that is GIS-indexed, it employs laser rangefinder 122 to determine the distance to the surfaces 150 that are within range of the device. The laser rangefinder 122 can be used both for autonomous localization and navigation, and to sense for differential feature data to update the map. Door 152 can include, for example, an RFID tag 154 that can be interrogated by an RFID sensor onboard the autonomous mobile data collecting platform 110 to determine attributes of the door 152 feature. These attributes might include a unique identifier, or a manufacturer and model number. Autonomous mobile data collecting platform 110 can query a database that might be onboard or within a network that the autonomous mobile data collecting platform can communicate with to collect more information on the door (its dimensions and/or the materials from which it is made, for example), or it can simply store or transmit the sensed data for later processing. If the identification information for the door is different from that recorded in the GIS map, either because, for example, the door has been replaced since the last patrol or because the previous version of the GIS map was created from an architectural map and the door installed was different from the door specified, then the differential data is used to update the map to show the correct door at this location. In addition, autonomous mobile data collecting platform 110 can employ its range-finding sensor 122 to determine whether the door 152 is open or closed, and at least for some angles, at what angle the door is open. If this information is different from that recorded on the map, i.e., the map shows the door at this location as closed and now it is open, this is further differential data that can be used to update the map. This type of data can be useful for a number of reasons, including security, hazardous material containment, clean room maintenance, and to check whether any sensors placed on the door itself to sense whether it is open or closed are functioning properly.

Figure 7A:
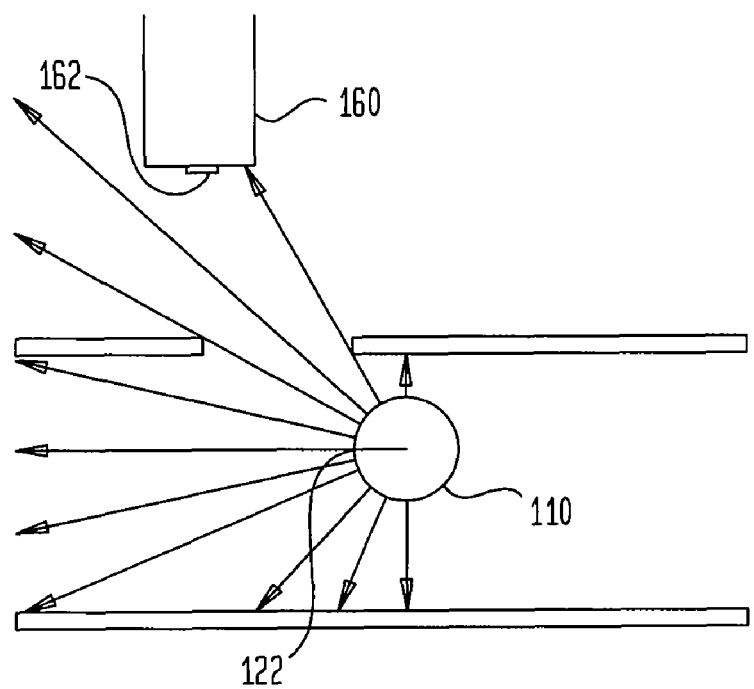
FIG. 7A illustrates the patrolling of an autonomous mobile data collecting platform to collect data, including the location, regarding a feature.

In a further example illustrated by reference to FIGS. 7A, 7B, and 7C, an autonomous mobile data collecting platform 110 having a range-finding sensor 122 patrols in a mapped area. The range finder may aid in localization and navigation with respect to the map, and/or it may be used to sense the position and orientation of features 160 present on the map. In a first view in FIG. 7A, the autonomous mobile data collecting platform determines the location of feature 160, and may also determine other attributes, for example by querying RFID tag 162 associated with the feature and the location and other information is stored on the map.

Figure 7B:
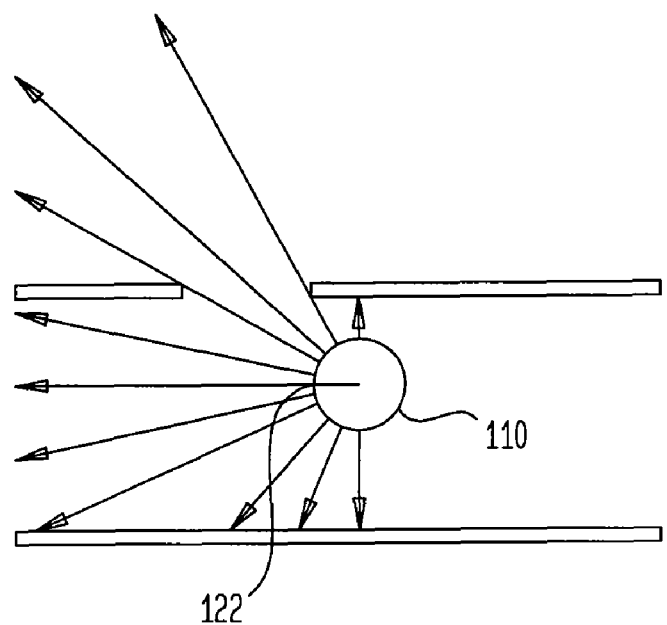
FIG. 7B illustrates the situation of FIG. 7A where the feature has been removed.

In a further patrol, illustrated in FIG. 7B, the autonomous mobile data collecting platform 110 (which may be the same or a different platform from the previous patrol) determines that the feature 160 is no longer present at the previous location according to the map. The lack of feature 160 from the location can be determined from the range-finding sensor 122 data, or from a query of RFID tag 162, or a combination of the two. The map is updated to reflect this differential data, i.e., the feature 160 is no longer at the previously identified location.

Figure 7C:
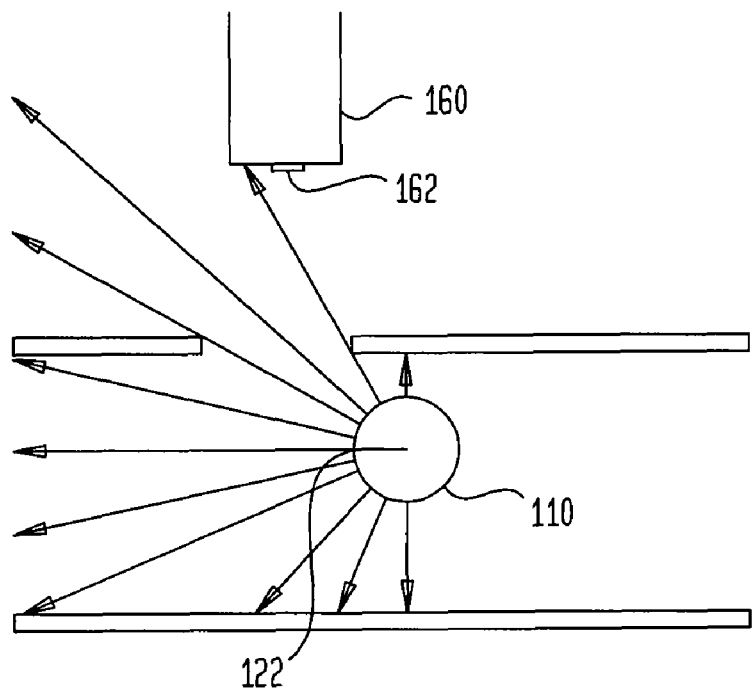
FIG. 7C illustrates the situation of FIG. 7A where the feature has been moved.

In a still further patrol, illustrated in FIG. 7C, the autonomous mobile data collecting platform 110 (which, again, may be the same or a different platform from the previous patrolling) identifies feature 160, which has now been moved to a different position. The autonomous mobile data collecting platform can measure this new position, and it can be added to the map as differential data.

In addition to using RFID and range-finding sensors to note the existence and location of features, the autonomous mobile data collecting platform can include a number of different sensor to collect location and/or time stamped data. By way of example, the autonomous mobile data collecting platform could carry a temperature sensor to note temperature changes in server rooms and other places where variations in temperature might be important, camera or imaging sensors to determine differential image data, hazardous material determining sensors, and the like.

The invention being thus disclosed and illustrative embodiments depicted herein, further variations and modifications of the invention will occur to those skilled in the art. All such variations and modifications are considered to be within the scope of the invention, as defined by the claims appended hereto and equivalents thereof.

What is claimed is:

1. A method for mobile autonomous updating of GIS maps, the method comprising:
   a) providing an autonomous mobile data collecting platform with a map identifying one or more GIS features, the platform having at least one data collecting sensor for collecting data for at least one of the GIS features;
   b) patrolling at least a portion of a region included in the map by the autonomous mobile data collecting platform, the autonomous mobile data collecting platform updating its GIS position as it patrols;
   c) applying of the at least one data collecting sensor during patrolling by the autonomous mobile data collecting platform to collect data for at least one of the GIS features; and
   d) updating the GIS map to reflect differential data collected for at least one GIS feature.

2. The method of claim 1, wherein the data collecting sensor is applied at discrete locations on the GIS map during patrolling.

3. The method of claim 1, wherein the data collecting sensor is applied continuously throughout patrolling.

4. The method of claim 1, wherein time delineated routes are provided to the autonomous mobile data collecting platform to patrol.

5. The method of claim 1, wherein the data collected by the at least one data collecting sensor is linked to a time that the data was collected and a location of the mobile autonomous platform.

6. The method of claim 5, wherein the time is determined by a GPS receiver.

7. The method of claim 5, wherein the time is determined by an onboard clock that is calibrated to a global time reference.

8. The method of claim 5, wherein the location is determined by a GPS receiver.

9. The method of claim 5, wherein the location is determined using Monte-Carlo/Markov localization to determine the location of the mobile autonomous platform on the map.

10. The method of claim 1, wherein the at least one GIS feature has one or more attributes, in addition to location, that can be determined by the at least one data collecting sensor.

11. The method of claim 10, wherein the one or more attributes includes a unique identifier.

12. The method of claim 11, wherein updating the GIS map includes noting a change in location of the at least one GIS feature having a unique identifier.

13. The method of claim 11, wherein updating the GIS map includes noting the addition of a new GIS feature having a unique identifier.

14. The method of claim 10, wherein updating the GIS map includes noting the absence of the at least one GIS feature from its location on the map.

15. The method of claim 10, wherein the at least one data collecting sensor includes an RED sensor.

16. The method of claim 15, wherein the attributes of the feature include an identifier from which physical features of the feature can be looked up in a database.

17. The method of claim 10, wherein the at least one data collecting sensor includes an imaging sensor.

18. A method for recording differential data on a map indexed in a uniform universal reference frame, the method comprising:
   a) providing an autonomous mobile data collecting platform with a map identifying plurality of features in the reference frame, the platform having at least one data collecting sensor for collecting data for at least one of the features and at least one positioning sensor for determining the autonomous mobile platform's location on the map;
   b) patrolling at least a portion of a region included in the map by the autonomous mobile data collecting platform, the autonomous mobile data collecting platform applying the at least one positioning sensor to update its position on the map as it patrols;
   c) applying of the at least one data collecting sensor during patrolling by the autonomous mobile data collecting platform to collect data for at least one feature; and
   d) updating the map to reflect differential data collected for the feature.

19. The method of claim 18, wherein the universal uniform spatial reference frame is GIS with positions recorded using GPS coordinates.

20. The method of claim 18, wherein the differential data reflects a different position for the feature.

21. The method of claim 20, wherein the differential data reflects that the feature has been removed from a prior recorded location.

22. The method of claim 18, wherein the differential data reflects a change in an attribute of the feature.

23. The method of claim 18, wherein updating the map to reflect differential data collected for the feature includes recording the time at which the data collecting sensor was applied to collect the data.

24. The method of claim 23, wherein updating the map to reflect differential data collected for the feature includes recording the location at which the data collecting sensor was applied to collect the data.

25. The method of claim 24, wherein the at least one positioning sensor includes a range finding sensor for determining the location of features relative to the mobile platform.

26. The method of claim 25, wherein the at least one positioning sensor includes an odometry sensor.

27. The method of claim 25, wherein the at least one positioning sensor includes an inertial navigation sensor.

28. The method of claim 24, wherein the at least one positioning sensor includes a GPS sensor.

29. The method of claim 18, wherein the sensor for determining an attribute of the feature is an image sensor.

30. The method of claim 18, wherein the sensor for determining an attribute of the feature is an RFID sensor.

* * * * *